June 24, 1969      J. E. SHUMWAY      3,451,530
CROP CONVEYING MEANS FOR HARVESTERS
Filed June 7, 1967      Sheet 1 of 2

Inventor:
John E. Shumway
By Neal C. Johnson
Atty.

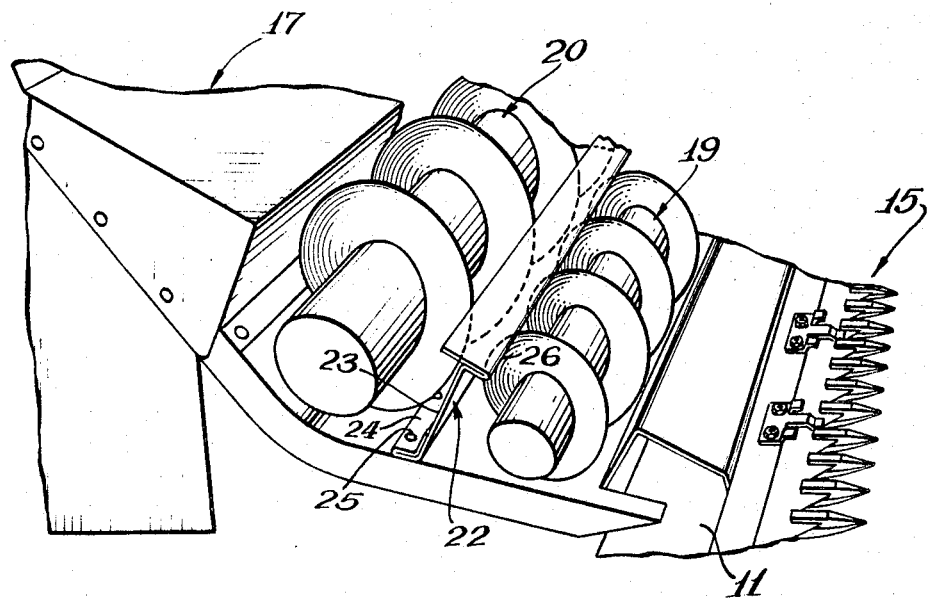
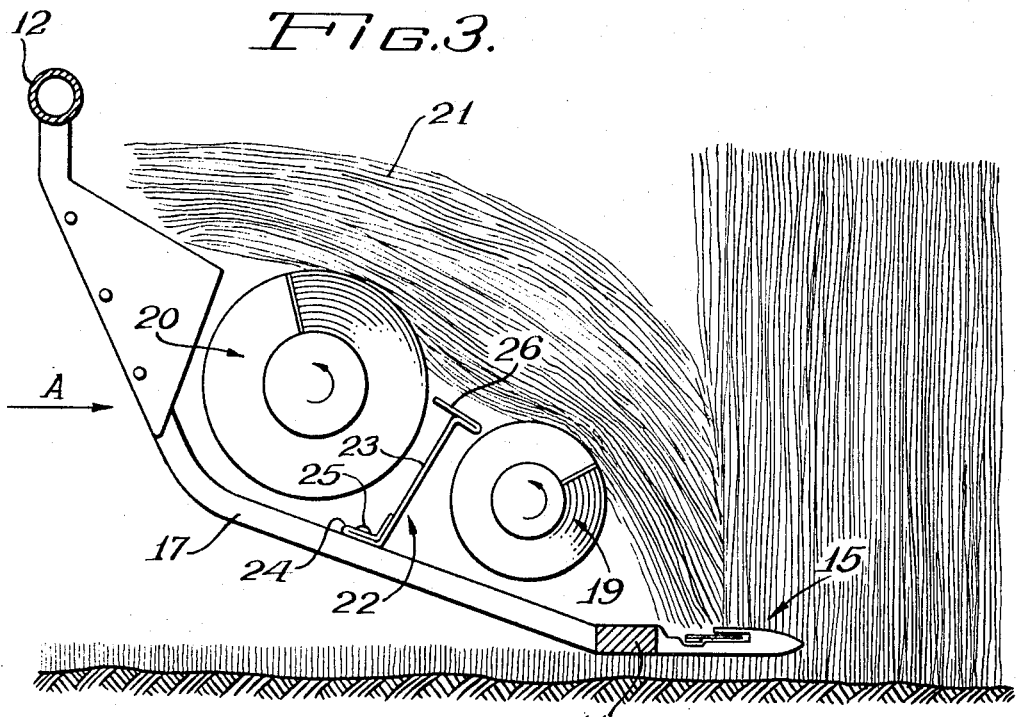

United States Patent Office 3,451,530
Patented June 24, 1969

3,451,530
CROP CONVEYING MEANS FOR HARVESTERS
John E. Shumway, Park Ridge, Ill., assignor to International Harvester Company, Chicago, Ill., a corporation of Delaware
Filed June 7, 1967, Ser. No. 644,265
Int. Cl. B65g 33/10, 65/22; A01d 57/06
U.S. Cl. 198—213                    10 Claims

ABSTRACT OF THE DISCLOSURE

A crop harvesting platform for windrowers and the like including plural parallel crop-conveying augers which carry the cut crop laterally to a crop discharge area defined in the platform. A crop stripping and supporting member is mounted on the platform between the parallel augers for preventing wedging of the crop between the augers.

CROSS REFERENCE TO RELATED APPLICATIONS

This application relates generally to subject matter disclosed in copending application Ser. No. 622,845, of William D. Drummond, for Auger Platform Windrower, filed Jan. 23, 1967.

BACKGROUND OF THE INVENTION

Field of the invention

This invention relates to harvesters and more particularly to a harvester platform having an improved conveyor construction for conveying a cut crop to a crop discharge area for forming windrows.

Description of the prior art

Harvester platforms of the type described in the above mentioned application produce excellent results in a wide variety of crops. However, it has been found that under unusual conditions certain crops have a tendency to fall and wedge between the parallel augers with the possibility of the crop wrapping around the frontmost of the augers. The wrapping is undesirable since the smooth flow of the crops on the augers is slowed or interrupted.

SUMMARY

With the foregoing in mind it is accordingly a primary object of this invention to provide a crop conveying system for a harvester platform in which crop conveying augers and interposed crop stripping and supporting means cooperate to support and convey a cut crop longitudinally of the platform in such manner as to prevent clogging, wedging, and wrapping of the crop in the conveying system.

Briefly, these and other objects and advantages of the invention are attained by providing a crop harvester having a laterally elongated platform with a crop discharge area. At least two parallel augers extend lengthwise of the platform in superposed relation thereto for carrying the crop thereon toward the discharge area. The invention includes crop stripper means mounted on the platform in interposed relation with respect to the augers for preventing the crop from falling and wedging between the augers. Consequently, the crop is maintained on the augers for movement thereby toward the crop discharge area.

BRIEF DESCRIPTION OF THE DRAWINGS

FIGURE 2 is a fragmentary perspective view of a portion of the harvester platform of FIGURE 1; and FIGURE 3 is a cross-sectional view taken in the direction of arrows 3—3 of FIGURE 1.

DESCRIPTION OF THE PREFERRED EMBODIMENT

Figure 1:
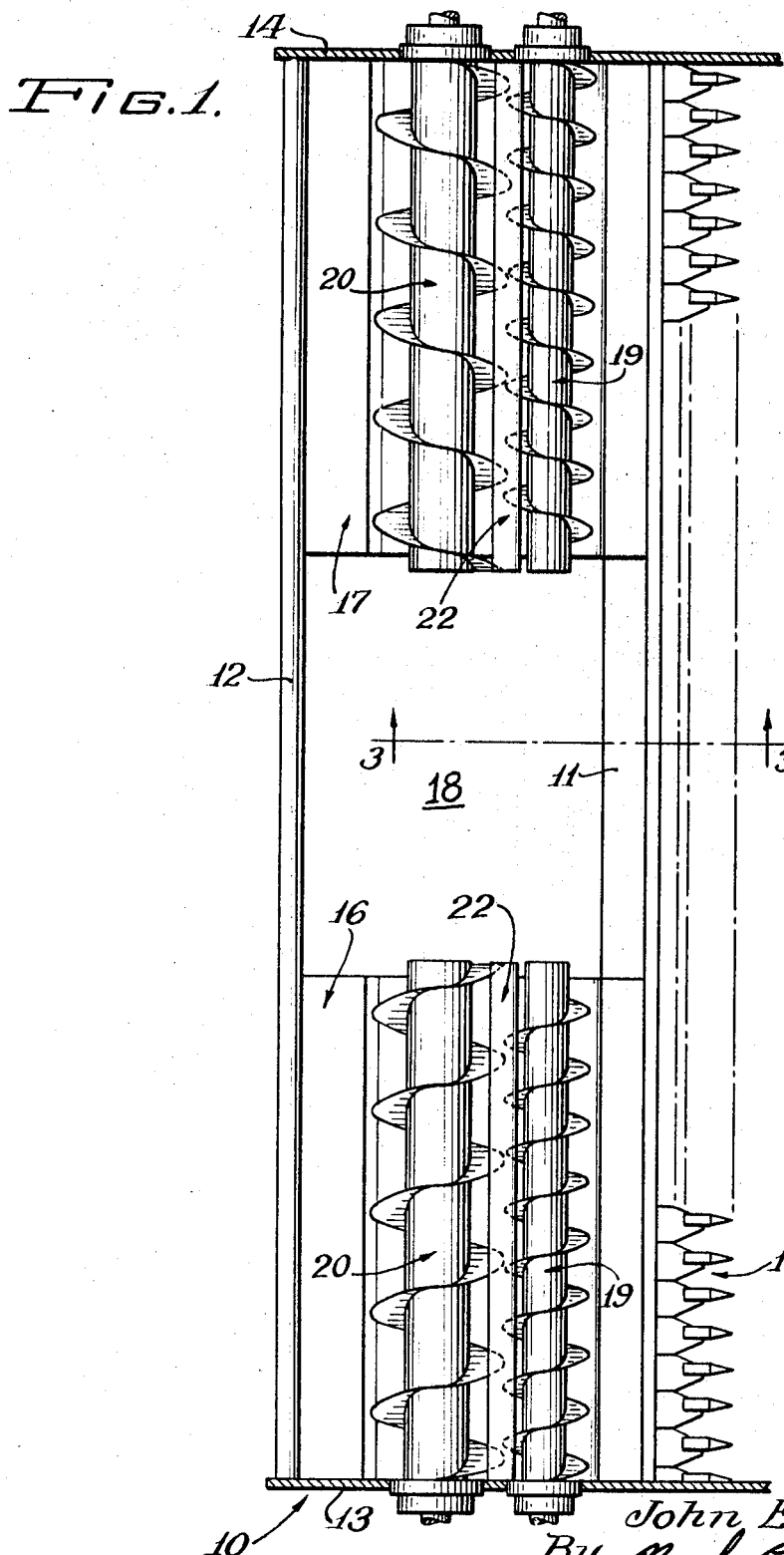
FIGURE 1 is a plan view of a harvester platform incorporating the conveying means of the invention.

Referring first to FIGURE 1, there is shown a harvester platform 10 which may be attached to a self-propelled vehicle (not shown) for windrowing operations. The platform 10 includes a front beam 11 and an upwardly and rearwardly disposed beam 12 which extend between upright side walls 13 and 14. A sickle type mower 15 is secured to the front beam 11 for cutting a standing crop along the entire length of the platform. A conventional pickup reel (not shown) is normally mounted between the side walls 13 and 14 for sweeping the standing crop rearwardly against the mower and then onto the platform.

The platform 10 includes a pair of bottom ramps 16 and 17 extending generally upwardly and rearwardly between the beams 11 and 12 adjacent to the side walls 13 and 14, respectively. The ramps 16 and 17 are spaced apart longitudinally of the platform to define a central crop discharge opening 18 therebetween. The details and function of the ramps 16 and 17 are clearly described in the above mentioned copending application.

Mounted in superposed relation with respect to each of the ramps 16 and 17 is a front auger 19 and a rear auger 20. The augers 19 and 20 are rotatably mounted in parallel relation and extend longitudinally of the platform along the length of the respective ramps 16 and 17 for supporting and conveying the cut crop lengthwise of the platform inwardly to the crop discharge opening 18. The augers may be of the various types shown and described in the above mentioned application.

In the embodiment shown herein and as best seen in FIGURE 2, the rear auger 20 is of larger diameter and is positioned upwardly and rearwardly with respect to the front auger 19. The augers are journaled in the respective side walls 13 and 14 for rotation in the same direction for supporting and conveying the crop thereon toward the crop discharge opening 18.

As best shown in FIGURE 3 the respective ramp 17 and the augers 19 and 20 present an upwardly and rearwardly inclined profile upon which the cut crop 21 is supported as it is conveyed toward the discharge opening 18. In spite of the fact that the augers 19 and 20 are normally disposed in closely spaced relation as shown, unusual crop conditions may be encountered which cause portions of the crop to fall and wedge between the augers.

In order to solve the above problem the invention includes the provision of means for stripping the crop from the front auger 19 and supporting the crop between the augers to prevent its falling and wedging therebetween. Toward that end, a stripper and crop supporting member shown generally at 22 is mounted on each of the ramps 16 and 17 in interposed parallel relation to the respective augers 19 and 20.

As more clearly shown in FIGURE 2, the member 22 includes an elongated panel portion 23 extending upwardly between the augers along the length of the respective ramp 17. The member 22 includes a mounting flange 24 extending transversely from the lower edge of the panel portion 23 along the length thereof. The mounting flange 24 is positioned on the respective ramp and secured thereon by a plurality of bolts 25.

The member 22 terminates at its upper edge in an elongated plate portion 26 extending transversely to the panel portiton 23 and longitudinally of the augers. As shown in FIGURE 1, the plate portion 26 preferably extends the length of the parallel augers which may project inwardly beyond the edges of the respective ramps 16 and 17 as shown.

As best shown in FIGURE 3, the panel portion 23 and the plate portion 26 together form a substantially T-shaped cross section. This particular configuration is preferred since it enables the augers to be mounted in closely spaced relation since the plate portion 26 should preferably be disposed above the point of closest proximity of the augers to perform its crop-stripping and supporting function. The plate portion 26 is also disposed beneath and substantially parallel to a plane tangential to the upper crop-carrying portions of the augers 19 and 20. Thus in the embodiment shown, the plate portion 26 is disposed chordally with respect to the augers.

In operation, the standing crop is cut by the mower 15 as the harvester platform 10 is moved forwardly in the direction of arrow A. The cut crop 21 is deposited on the upper portions of the augers 19 and 20 as shown for conveyance toward the discharge opening 18 (FIGURE 1). It will be seen that the plate portion 26 of the member 22 serves the dual function of stripping the crop from the front auger 19 and supporting the crop in the area between the augers. Consequently, the crop is effectively prevented from falling and wedging between the augers as the same is conveyed toward the crop discharge area.

From the foregoing, it will be appreciated that the crop conveying means of the invention provides a smooth uninterrupted flow of the crop along the harvester platform toward the crop discharge area. Consequently, the harvesting operation may proceed with a minimum of work stoppages.

Various changes falling within the scope and spirit of the invention will occur to those skilled in the art. The invention is, therefore, not to be thought of as limited to the specific embodiments set forth.

What is claimed is:

1. In a crop harvester having a laterally elongated platform with a crop discharge area, at least two parallel augers extending lengthwise of said platform in superposed relation thereto for supporting and carrying the crop laterally thereon toward said discharge area, and crop stripper means mounted on said platform in interposed relation to said augers for preventing the crop from falling and wedging between said augers, whereby the crop is maintained on said augers for movement thereby toward said crop discharge area.

2. In a crop harvester having a laterally elongated platform with a crop discharge area, at least two parallel augers extending lengthwise of said platform in superposed relation thereto for carrying the crop laterally thereon toward said discharge area, and crop stripper means mounted on said platform in interposed relation to said augers for preventing the crop from falling and wedging between said augers, whereby the crop is maintained on said augers for movement thereby toward said crop discharge area, said crop stripper means including a substantially T-shaped cross section extending upwardly from said platform and lengthwise thereof in substantially parallel relation to said augers, the top portion of said member being disposed beneath a plane tangential to the upper crop-carrying portion of said augers so as to be disposed in crop-supporting relation with respect to said augers.

3. The subject matter of claim 2, in which said top portion of said T-shaped member extends the length of said augers.

4. The subject matter of claim 2, in which said top portion of said member is disposed above the point of closest proximity of said augers.

5. In a crop harvester having a laterally elongated platform with a crop discharge area, at least two parallel augers extending lengthwise of said platform in superposed relation thereto for carrying the crop laterally thereon toward said discharge area, and crop stripper means mounted on said platfom in interposed relation to said augers for preventing the crop from falling and wedging between said augers, whereby the crop is maintained on said augers for movement thereby toward said crop discharge area, said crop stripper means including an elongated panel portion extending upwardly between said augers and terminating at its upper edge in a crop-supporting plate portion extending transversely of said panel portion and along the length of said augers, said plate portion being disposed beneath a plane tangential to the upper crop-carrying portions of said augers so as to be disposed in crop-supporting relation with respect to said augers.

6. The subject matter of claim 5, in which said augers are positioned one behind the other with the rearmost auger having a larger diameter than the frontmost auger, said plate portion being upwardly and rearwardly inclined in generally parallel relation to said plane.

7. The subject matter of claim 5, in which said augers are positioned one behind the other with the rearmost auger being disposed at a higher elevation than the frontmost auger, said plate portion being upwardly and rearwardly inclined in generally parallel relation to said plane.

8. In a crop harvester having a platform elongated transversely to the direction of travel, said platform having a pair of bottom sections longitudinally spaced apart to define a crop discharge area therebetween, at least two parallel augers superposed with respect to each of said sections and extending lengthwise of the platform for supporting and conveying the crop toward said discharge area, and crop stripper means mounted on each of said sections in interposed relation to said augers for preventing the crop from falling and wedging between said augers, whereby the crop is maintained on said augers for movement thereby toward said crop discharge area.

9. In a crop harvester having a platform elongated transversely to the direction of travel, said platform having a pair of bottom sections longitudinally spaced apart to define a crop discharge area therebetween, at least two parallel augers superposed with respect to each of said sections and extending lengthwise of the platform for supporting and conveying the crop toward said discharge area, and crop stripper means mounted on each of said sections in interposed relation to said augers for preventing the crop from falling and wedging between said augers, whereby the crop is maintained on said augers for movement thereby toward said crop discharge area, said crop stripper means including a member of substantially T-shaped cross section extending upwardly from the respective bottom section and lengthwise thereof in substantially parallel relation to said augers, the top portion of each of said members being disposed beneath a plane tangential to the upper crop-carrying portions of said augers so as to be disposed in crop-supporting relation with respect to said augers.

10. The subject matter of claim 9, in which said top portion is disposed chordally with respect to said augers.

References Cited

UNITED STATES PATENTS 2,122,673  7/1938  Sheets _____ 198—213

FOREIGN PATENTS 22,966  4/1962  Germany.

EDWARD A. SROKA, *Primary Examiner.*

U.S. Cl. X.R.

56—20; 198—9